UNITED STATES PATENT OFFICE.

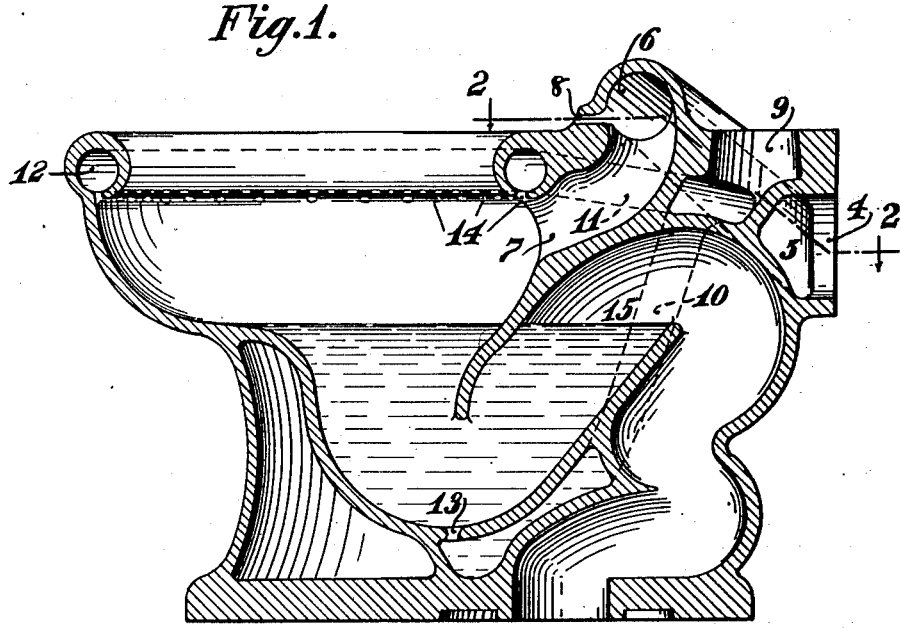
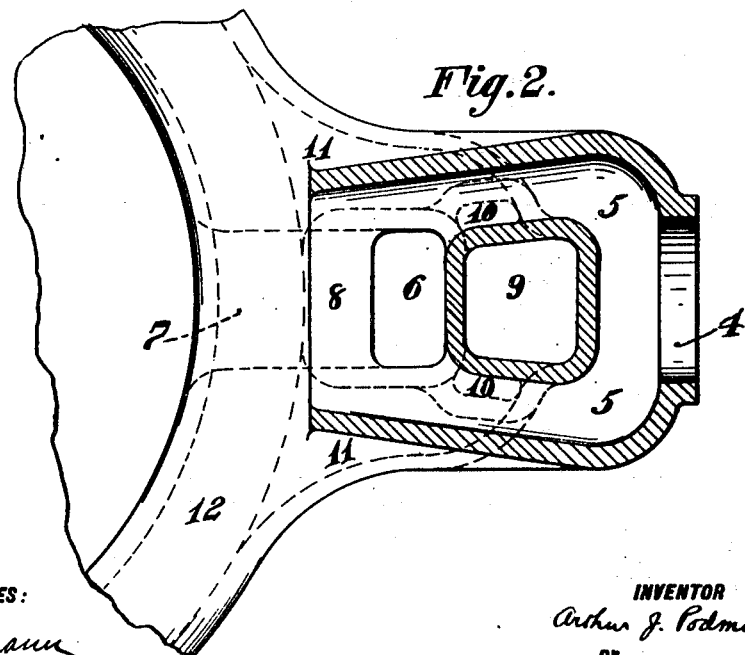

ARTHUR J. PODMORE, OF CAMDEN, NEW JERSEY.

WATER-CLOSET.

1,048,872.

Specification of Letters Patent.

Patented Dec. 31, 1912.

Application filed April 29, 1911. Serial No. 624,048.

*To all whom it may concern:*

Be it known that I, ARTHUR J. PODMORE, a citizen of the United States, residing at Camden, in the county of Camden, State of New Jersey, have invented a new and useful Water-Closet, of which the following is a specification.

My invention relates to improvements in water closets.

My object is to provide improved means for ventilating the bowl and the space immediately above the bowl and at the same time connecting the vent outlet or conductor at a point below the surface of the bowl and below the water inlet.

Referring to the drawings which illustrate, merely by way of example, a device embodying my invention—Figure 1 is a vertical section of a bowl showing my improvements. Fig. 2 is a fragmentary horizontal section, on an enlarged scale, on line 2—2 of Fig. 1.

Similar numerals refer to similar parts throughout the several views.

The vent outlet or aperture in the bowl structure which is adapted to be connected with a suitable exhaust vent pipe or conductor is indicated by 4. The vent channels 5 lead to outlet 4 from a chambered portion 6 located above the level of the bowl. The vent channel 7 leads from the interior of the bowl to the chambered portion 6. The vent channel 8 leads from above the bowl to the chambered portion 6. This channel 8 is substantially horizontal and has its lower wall above the top level of the bowl, thereby forming a bank to prevent the overflow of water from the bowl into channel 8 in case of flooding, from stoppage of soil pipe or other cause.

9 indicates the water inlet aperture, being connected by channels 10 to the siphon jet 13, and by channels 11 to the rim channel 12, said rim channel 12 being provided with a number of flushing apertures 14. The vent channel 7 is centrally located and leads from the interior of the bowl to the chambered portion 6, while the vent channels 5 are two in number, and flank the inlet 9 and vent channel 7. The water channels 10 are also two in number, and flank the passage 15 from the bowl to the trap. The water channels 11 are two in number and flank the vent channel 7.

It will be noted that the water inlet 9 is shown as adapted to connect with a vertically extending supply pipe, but this is purely incidental, as the direction of the supply pipe is immaterial; the feature being that the vent outlet 4 is beneath the water inlet 9, which is a much more convenient arrangement. This vent outlet however is connected by channels 5 to a chamber located above the level of the top of the basin, so that there is no danger of water entering the air vent outlet from any cause, such as stoppage of the waste and overflowing of the bowl.

By means of the two channels 7 and 8, efficient ventilation, both of the bowl and of the atmosphere immediately above the bowl, is secured without in any way interfering with the proper flushing of the bowl by means of the siphon jet 13 and the flushing rim 12.

What I claim is:—

1. A water closet having a chambered portion above the bowl and a vent outlet nozzle located below the top of the bowl and having a channel connection with the chambered portion, said chambered portion having a channel connection with the interior of the bowl and a channel delivery above the top margin of the bowl.

2. A water closet having a water inlet, a chambered portion above the top of the bowl, a vent outlet located below the top of the bowl and channels straddling the water inlet connecting the outlet with the chambered portion, and vents connected with the chambered portion, one above the level of the bowl and the other below the flushing rim.

3. A water closet, comprising a unitary structure having a chambered portion above the bowl, a vent outlet and a water inlet, the vent outlet located below the water inlet, the vent outlet connected with the chambered portion by channels flanking the water inlet, and an inlet vent in the bowl communicating with said chambered portion.

4. A water closet bowl of the siphon class, having a flushing rim channel and a siphon jet, a water inlet and a ventilating outlet, the ventilating outlet connected with channels leading to a chambered portion located above the top of the bowl margin, said chambered portion having inlet channels leading from the interior of the bowl and from above the bowl, the water inlet having water channels connected therewith leading to the rim channel and to the siphon jet.

ARTHUR J. PODMORE.

Witnesses:
 MAE HOFMANN,
 HOWARD S. OKIE.